United States Patent [19]

Case et al.

[11] Patent Number: 4,649,651
[45] Date of Patent: Mar. 17, 1987

[54] GAGE FOR MEASURING FLUTED OIL FIELD TUBULAR MEMBERS

[75] Inventors: Wayne A. Case; James R. Burt, both of Portland, Oreg.

[73] Assignee: Kwik Products Corp., Portland, Oreg.

[21] Appl. No.: 768,958

[22] Filed: Aug. 23, 1985

[51] Int. Cl.⁴ .............................................. G01B 3/34
[52] U.S. Cl. ................................................. 33/178 B
[58] Field of Search .................. 33/168 B, 178 B, 501, 33/541, DIG. 14

[56] References Cited

U.S. PATENT DOCUMENTS

| 2,925,659 | 2/1960 | Lovely | 33/178 B |
| 3,046,671 | 7/1962 | Moores | 33/178 B |

FOREIGN PATENT DOCUMENTS

| 251615 | 2/1911 | Fed. Rep. of Germany | 33/178 B |
| 312428 | 5/1919 | Fed. Rep. of Germany | 33/178 B |
| 567724 | 2/1945 | United Kingdom | 33/178 B |

Primary Examiner—Richard R. Stearns
Attorney, Agent, or Firm—Hubbard, Thurman, Turner & Tucker

[57] ABSTRACT

Disclosed is a gage for measuring the nominal diameter of an elongated tubular member having a plurality of circumferentially spaced apart radially outwardly extending flutes. The gage includes a first gage part having a generally semi-circular segment with a flute engaging surface and a similar second gauge part including a generally semi-circular flute engaging surface. The first and second gage parts are joined together, preferably by a hinge, to form a generally circular ring adapted to fit about the tubular member. Each flute engaging surface includes a plurality of stepped arcuate flute engaging portions that are spaced at radii from the center of the ring corresponding to nominal diameters to be measured.

1 Claim, 3 Drawing Figures

GAGE FOR MEASURING FLUTED OIL FIELD TUBULAR MEMBERS

BACKGROUND OF THE INVENTION

A. Field of the Invention

The present invention relates to gages for measuring the nominal diameter of oil field tubular members and more particularly to a gage for measuring fluted oil field tubular members of different nominal diameters wherein the member may be measured without slipping the gage over the end of the member.

B. Description of the Prior Art

In oil and gas well and other types of earth drilling operations, it is often necessary to provide downhole tools interposed at predetermined points in the drill stem or string for performing functions such as stabilizing or centralizing the drill stem in the hole or reaming the hole. The stabilizing and centralizing functions are performed by tools known as stabilizers, which include a plurality of radially outwardly extending circumferentially spaced apart flutes formed on or joined to a heavy walled tubular member such as a drill collar. The flutes may be either straight or helical. The reaming function is performed by reamers which include a plurality of radially outwardly extending circumferentially spaced apart reaming tools joined to a heavy walled tubular member.

Downhole tools such as stabilizers and reamers are subject to high rates of wear and require frequent inspection or gaging in order to determine that the diameter described by their flutes is within tolerance. Typically, the stabilizers or reamers are gaged when the drill stem is being tripped into the hole after a bit change. Stabilizers and reamers are currently gaged by means of ring gages having an inside diameter equal to the nominal diameter of the stabilizer or reamer. The ring gages are slipped over the ends of the stabilizer or reamer and the person performing the gaging operation estimates the amount of wear on the flutes. It is therefore necessary to break the drill stem at each stabilizer during the tripping in process, which causes both delay and increases wear and the potential for failure of the threaded connections between the stabilizers and drill collars or the like. Also, the driller is required to have a different ring gage for each size stabilizer or reamer.

Accordingly, it is an object of the present invention to provide a gage that overcomes the shortcomings of the prior art. More particularly, it is an object of the present invention to provide a gage for measuring or checking the nominal diameter of a fluted oil field tubular member that may be used without the necessity for breaking the drill stem. It is a further object of the present invention to provide a single gage for measuring or checking the nominal diameters of fluted oil field tubular members of various nominal diameters. It is yet a further object of the present invention to provide a gage that allows an operator to estimate closely the amount of wear to which a fluted oil field tubular member has been subjected and predict further wear life by providing a calibration capability not previously available.

SUMMARY OF THE INVENTION

Briefly stated, the foregoing and other objects are accomplished by the gage of the present invention, which includes a first gage part having a generally semi-circular flute engaging surface and a second gage part having a generally semi-circular flute engaging surface. The first and second gage parts are joined together to form a generally circular ring. Preferably, the first and second gage parts are joined together by means of a hinge which allows the ring to be swung open and closed about the tubular member.

The flute engaging surfaces of the ring formed by the first and second gage parts include a plurality of stepped arcuate flute engaging portions. The flute engaging portions are grouped together in sets corresponding to the number of flutes on the tubular member. For example, a gage for measuring stabilizers having three flutes has three sets of arcuate flute engaging portions. The flute engaging portions of each set are stepped to be positioned at varying radii from the center of the ring with the radii corresponding to the different tubular members to be measured.

Preferably, the gage of the present invention includes a pair of elongated diametrically opposed handlebars which enable an operator to handle and operate the gage conveniently. Preferably, the handlebars are formed by complimentary pairs of handlebar halves exending from the ends of the gage parts. One set of corresponding handlebar halves of the gage parts is hingedly connected together, thereby to provide the connection between the gage parts. The other complimentary sets of handlebar halves provide convenient means to the operator for opening and closing the gage about the tubular member. When the gage is closed about the tubular member, the opposed handlebars provide convenient means to the operator for moving the gage both circumferentially and axially with respect to the tubular member. The placement of the hinge at the end of one of the handlebars allows the gage to be opened and closed in a wide arc about the tubular member so that the flutes do not hang up on the stepped flute engaging portions. The invention enables the operator not only to measure the nominal diameter of the tubular member but also to calibrate the rate of wear to the flutes and predict the future wear life of the member, all with a single gage.

DESCRIPTION OF THE PREFERRED EMBODIMENT

Figure 1:
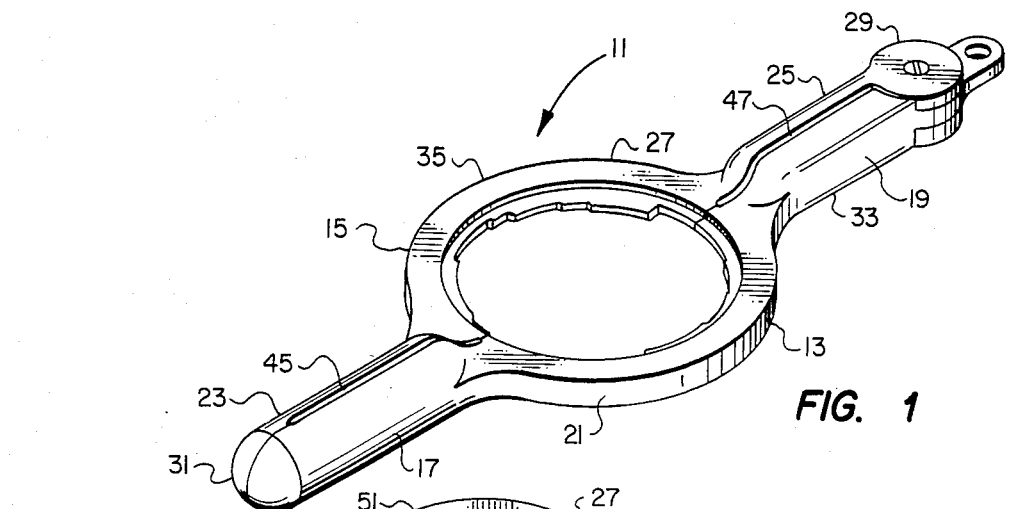
FIG. 1 is a perspective view of the gage of the present invention.
Figure 2:
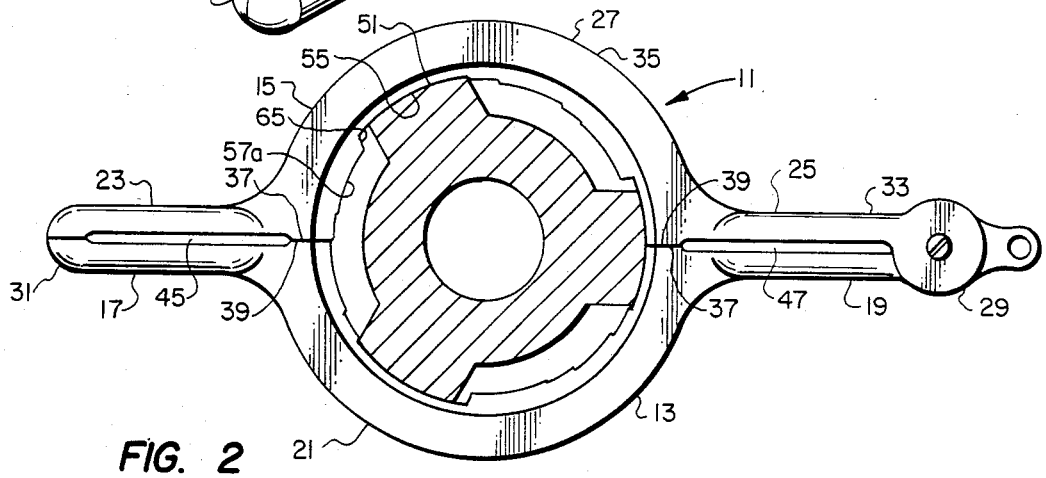
FIG. 2 is a top view of the gage of the present invention in the closed position about a three bladed stabilizer shown in section.
Figure 3:
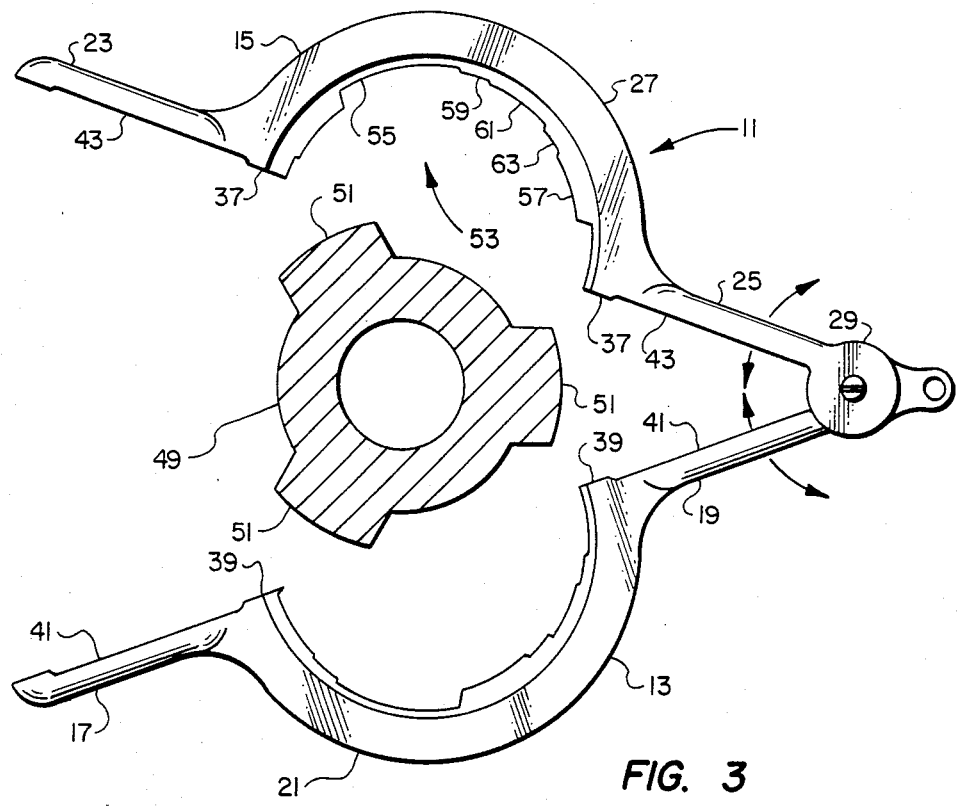
FIG. 3 is a top view of the gage of the present invention in an open position about a three bladed stabilizer shown in section.

Referring now to the drawing, the gage of the present invention is designated generally by the numeral 11. Gage 11 includes a first gage part 13 and a similar second gage part 15. First gage part 13 includes a pair of diametrically opposed elongaged handlebar halves 17 and 19 with a generally semi-circular half ring 21 positioned therebetween. Similarly, second gage part 15 includes a pair of diametrically opposed handlebar halves 23 and 25 with a generally semi-circular half ring 27 positioned therebetween. Handlebar half 19 of first gage part 13 and handlebar half 25 of second gage part 15 are pivotally connected together by a hinge 29. Gage parts 13 and 15 are thus moveable between an open position, as shown in FIG. 3, and a closed position, as shown in FIGS. 1 and 2. In the closed position, handlebar halves 17 and 23 and handlebar halves 19 and 25 form handlebars 31 and 33, respectively. Handlebars 31 and 33 may be of a cylindrical configuration sized for convenient gripping by an operator.

Also in the closed position, half rings 21 and 27 join to form a generally circular gage ring 35. Each half ring 21 and 27 is formed to include substantially 180° of arc and abutment flats 37 and 39 are machined or otherwise formed in gage parts 13 and 15, respectively, to insure substantialy circularity of gage ring 35. Recesses 41 and 43 may be formed in the handlebar halves of gage parts 13 and 15, respectively, to form spaces 45 and 47 in handlebars 31 and 33, respectively, so that the entire length of the handlebar halves do not have to be machined as precisely as the abutment flats and so that dirt does not affect the circularity of the gage.

Gage 11 is adapted for measuring or checking the nominal diameter of an elongated tubular member having a plurality of radially outwardly extending circumferentially spaced apart flutes. For example, in FIGS. 2 and 3, there is shown a section of a stabilizer 49 having three equiangularly spaced apart radially outwardly extending blades or flutes 51. Flutes 51 are adapted to engage the wall of the well bore to centralize and stabilize the drill stem in the hole during rotary drilling. Those skilled in the art will recognize that the stabilizer may include blades such as blades 51, or other configurations and numbers of flutes. The flutes may be straight or they may be helical. Also, as those skilled in the art will recognize, as used herein, the term flute refers not only to stabilizer blades such as those designated by the numeral 51, but also to appliances such as cutters and roller reamers.

Gage ring 35 includes an internal flute engaging surface, which in the preferred embodiment includes three sets of flute engaging portions. Referring to FIG. 3 for clarity, one set of flute engaging portions is designated generally by the numeral 53. Set 53 includes a plurality of stepped arcuate flute engaging portions positioned at selected radii from the center of ring guage 35 including a maximum radius flute engaging portion 55 and a minimum radius flute engaging portion 57. For example, maximum radius flute engaging portion may be positioned at a radius corresponding to a nominal diameter of 7 and $\frac{7}{8}$ inches and minimum radius flute engaging portion may be positioned at a radius corresponding to a nominal diameter of 7 and $\frac{3}{8}$ inches. Set 53 preferably includes intermediate flute engaging portions 59, 61, and 63 positioned at radii corresponding, for example, to nominal diameters of 7 and $\frac{3}{4}$ inches, 7 and $\frac{5}{8}$ inches, and 7 and $\frac{1}{2}$ inches, respectively. Thus, gage 11 is adapted to measure stabilizers 49, or the like, having nominal diameters ranging from, for example, 7 and $\frac{3}{8}$ inches to 7 and $\frac{7}{8}$ inches in $\frac{1}{8}$ inch increments. Those skilled in the art, of course, will recognize that gage ring 35 may be sized and configured to be used with fluted tubular members of other nominal diameters.

Referring to FIG. 2, it will be noted that maximum radius flute engaging portion 55 has an arc length greater than the width of flute 51 so that second gage part 15 may be swung to the open position without the shoulder 65 between maximum radius flute engaging portion 55 and the adjacent minimum radius flute engaging portion 57a does not hang up on flute 51. The excess arc length of maximum radius flute engaging portion 55 may be minimized by the proper spacing of hinge 29 from the center of guage ring 35, with the longer the hinge spacing, the less excess arc length required. In the preferred embodiment, hinge 29 is spaced from the center of ring 35 a distance equal to or greater than twice the maximum radius to be measured by the gage.

The arc lengths of the minimum radius flute engaging portion 57 and intermediate flute engaging portions 59–63 may be less than the width of flute 51. It will be noted that intermediate flute engaging portions 59 and 63 are of shorter arc length than flute engaging portions 61 and 57. Such short arc length flute engaging portions are useful in calibrating or determining the wear of flutes 51. For example, assuming that standard nominal diameters are 7 and $\frac{3}{8}$, 7 and $\frac{5}{8}$, and 7 and $\frac{7}{8}$ inches, which correspond to flute engaging portions 57, 61, and 55, respectively, flute engaging portions 59 and 63 may be at intermediate non-standard radii corresponding to, for example 7 and $\frac{1}{2}$ inches and 7 and $\frac{3}{4}$ inches. The operator may manipulate gage 11 by means of handlebars 31 and 33 to compare the actual diameter of stabilizer 49 to its nominal diameter and thereby estimate both the amount of wear to stabilizer 49 and calibrate the wear rate and life expectancy of stabilizer 49.

It will be seen that gage 11 is well adapted to meet the objects of the invention. The operator on the floor of the rig can position gage 11 about stabilizer 49 without breaking the drill string. Handlebars 31 and 33 provide convenient means for manipulating gage 11 both axially and circumferentially with respect to stabilizer 49. Thus, the operator may easily measure and calibrate stabilizer 49 at various points along its length. Gage 11 allows the operator to measure and calibrate with a single tool stabilizers of differing nominal diameter, thereby eliminating the need to have on hand a separate ring gage for each stabilizer nominal diameter. Gage 11 enables the operator not only to check the size of stabilizer 49 but also to calibrate the wear experienced by flutes 51. For example, if after having drilled 1,500 feet the operator finds that a stabilizer that was initially 7 and $\frac{7}{8}$ inches in diameter measured at all points along its length has worn such that it measures 7 and $\frac{5}{8}$ inches at its lowermost end and 7 and $\frac{3}{4}$ inches for the remainder of its length, the operator knows the rate of wear in terms of loss of diameter per unit depth drilled and can predict how much longer the stabilizer may be used before it must be replaced.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size, and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. A gage for measuring the nominal diameter of an elongated tubular member having a plurality of circumferentially spaced apart radially outwardly extending flutes and for calibrating the amount of wear to said flutes and predicting the future wear life of said tubular member, which comprises:

a first gage part including a pair of spaced apart colinear elongated first handlebar halves with a generally semi-circular first half ring positioned between said first handlebar halves, said first half ring including at least one flute engaging surface which includes a plurality of stepped arcuate flute engaging portions positioned at radii from the center of the first ring half corresponding to different diameters to be measured;

a second gage part including a pair of spaced apart colinear elongated second handlebar halves with a generally semi-circular second half ring positioned between said second handlebar halves, said second half ring including at least one flute engaging surface which includes a plurality of stepped arcuate flute engaging portions positioned a radii from the center of the second ring half corresponding to different diameters to be measured, wherein the number of flute engaging surfaces of said first and second ring halves is equal to the number of flutes on said tubular member;

and a hinge pivotally connecting together one handlebar half of said first gage part to one handlebar half of said second gage part.

* * * * *